US011101975B2

(12) United States Patent
Isshiki et al.

(10) Patent No.: US 11,101,975 B2
(45) Date of Patent: Aug. 24, 2021

(54) CIPHERTEXT MATCHING SYSTEM AND CIPHERTEXT MATCHING METHOD

(71) Applicant: NEC Corporation, Tokyo (JP)

(72) Inventors: Toshiyuki Isshiki, Tokyo (JP); Haruna Higo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 90 days.

(21) Appl. No.: 16/465,324

(22) PCT Filed: Dec. 2, 2016

(86) PCT No.: PCT/JP2016/085951
§ 371 (c)(1),
(2) Date: May 30, 2019

(87) PCT Pub. No.: WO2018/100740
PCT Pub. Date: Jun. 7, 2018

(65) Prior Publication Data
US 2019/0394018 A1   Dec. 26, 2019

(51) Int. Cl.
*H04L 9/00* (2006.01)
*H04L 9/08* (2006.01)
*H04L 9/32* (2006.01)

(52) U.S. Cl.
CPC .............. *H04L 9/006* (2013.01); *H04L 9/008* (2013.01); *H04L 9/0819* (2013.01); *H04L 9/3242* (2013.01); *H04L 9/3263* (2013.01)

(58) Field of Classification Search
CPC ....... H04L 9/006; H04L 9/008; H04L 9/0819; H04L 9/3242; H04L 9/3263; H04L 9/3271; H04L 9/3066; G06F 21/60
See application file for complete search history.

(56) References Cited

U.S. PATENT DOCUMENTS 6,910,129 B1 * 6/2005 Deng ............. H04L 9/3231
 713/171
10,020,933 B2   7/2018 Yasuda et al.
(Continued)

FOREIGN PATENT DOCUMENTS

JP   2006158851 A   6/2006
JP   2016114692 A   6/2016
(Continued)

OTHER PUBLICATIONS

International Search Report in International Application No. PCT/JP2016/085951, dated Feb. 21, 2017.
(Continued)

*Primary Examiner* — Meng Li
(74) *Attorney, Agent, or Firm* — Sughrue Mion, PLLC

(57) ABSTRACT

A ciphertext matching system, includes: a registration target data generation apparatus, a matching request apparatus, a data matching apparatus, and a matching support apparatus. The data matching apparatus generates a first-distance-related ciphertext in which a first distance between registered data and matching target data is kept secret by random numbers. The matching support apparatus generates a public key and a secret key and transmits the generated public key to the individual apparatuses. The data matching apparatus transmits the first-distance-related ciphertext to the matching support apparatus. The matching support apparatus determines whether the first distance obtained by decrypting the first-distance-related ciphertext with the secret key is included in a set of second distances in which the registered data and the matching target data are allowable to be matched each other and transmits a result of the determination to the data matching apparatus.

18 Claims, 11 Drawing Sheets

(56) References Cited

U.S. PATENT DOCUMENTS

| | | | |
|---|---|---|---|
| 10,211,986 B2 | 2/2019 | Isshiki | |
| 2006/0047606 A1* | 3/2006 | Yach | H04L 63/08 705/76 |
| 2006/0149966 A1* | 7/2006 | Buskey | H04L 9/3271 713/168 |
| 2013/0104209 A1* | 4/2013 | Nandakumar | H04L 9/3271 726/7 |
| 2013/0318351 A1* | 11/2013 | Hirano | H04L 9/3231 713/168 |
| 2014/0123231 A1* | 5/2014 | Low | H04L 63/0892 726/4 |
| 2016/0099807 A1 | 4/2016 | Isshiki | |
| 2016/0173275 A1* | 6/2016 | Yasuda | H04L 9/14 380/28 |
| 2017/0085382 A1* | 3/2017 | Kamakari | H04L 9/3073 |

FOREIGN PATENT DOCUMENTS

| | | |
|---|---|---|
| WO | 2012114452 A1 | 8/2012 |
| WO | 2014185447 A1 | 11/2014 |
| WO | 2014185450 A1 | 11/2014 |

OTHER PUBLICATIONS

Haruna Higo et al., "A Secure Biometric Authentication Scheme with Small Information Disclosure", The Institute of Electronics, Information and Communication Engineers, Symposium on Cryptography and Information Security, SCIS 2016, Jan. 10-22, 2016, pp. 1-11, (11 pages total).

Haruna Higo et al., "A Private Fingerprint Matching Scheme with Small Templates", The Institute of Electronics, Information and Communication Engineers, Symposium on Cryptography and Information Security, SCIS 2015, Jan. 20-23, 2015, pp. 1-7, (7 pages total).

Siamak F. Shahandashti et al., "Private Fingerprint Matching", ACISP2012, University of Paris, pp. 1-14, (14 pages total).

Written Opinion in International Application No. PCT/JP2016/085951, dated Feb. 21, 2017.

\* cited by examiner

CIPHERTEXT MATCHING SYSTEM AND CIPHERTEXT MATCHING METHOD

This application is a National Stage Entry of PCT/JP2016/085951 filed on Dec. 2, 2016, the contents of all of which are incorporated herein by reference, in their entirety.

FIELD

The present invention relates to a ciphertext matching system and a ciphertext matching method. In particular, it relates to a ciphertext matching system and a ciphertext matching method that allow ambiguity of encrypted data.

BACKGROUND

Along with the spread of cloud systems, recent years have seen a rapid spread of services based on user data placed on calculation resources connected to networks. Since more and more users' sensitive data is handled in these services, it has become important to guarantee that the user data is safely managed.

Under this situation, research and development has actively been conducted on techniques for managing encrypted data in an open network environment and performing, for example, search or statistical processing on the encrypted data without decrypting the encrypted data.

In addition, recent years have frequently seen crimes that exploit the vulnerability of personal authentication using conventional passwords or magnetic cards, and biometric authentication techniques based on safer biometric features such as fingerprints and veins have attracted attention. Regarding biometric authentication, to verify authentication target information, templates about biometric information data need to be stored in a database. Basically, biometric information such as fingerprints and veins is lifelong data, and leakage of such information results in significant damage. Thus, the information is considered as one of the most confidential information. Therefore, template-protection-type biometric authentication techniques that perform authentication while keeping template information secret have become important. In these techniques, impersonation cannot be performed even if a template is leaked. For example, PTL 1 proposes a biometric authentication scheme in which fingerprint data is expressed as individual points on a polynomial. The fingerprint data is kept secret by adding random points to the points, and the resultant data is used as a template.

NPL 1 proposes a scheme for protecting biometric information of clients requesting authentication by using public key encryption having a homomorphic property.

In general, biometric authentication schemes that do not protect biometric information, feature points are extracted from biometric information (for example, a fingerprint, etc.), and the feature points are registered in a server as an authenticated template. Generally, a feature point called minutia in fingerprint authentication is constituted by three components of a type, a coordinate (x, y), and an orientation. The type represents a type of the corresponding feature point and is, for example, a ridge ending, a ridge bifurcation, or the like. The coordinate represents a coordinate of the feature point, and the orientation represents an inclination of a tangent line at the feature point. In authentication processing, the server determines whether a minutia extracted from biometric information of a client matches a minutia registered as an authenticated template. When the following three conditions are satisfied, the server determines that the minutiae match each other.

First, the types match each other.
Second, the distance between the points is within a threshold range.
Third, the difference between the orientations is within a threshold range.

The following more specific example assumes that a registered minutia is represented by (type 1, (x1, y1), θ1) ad a minutia extracted in the authentication processing is represented by (type 2, (x2, y2), θ2). In this case, when all of the following three conditions are satisfied, the two minutiae are determined to match each other.

$$\text{type 1=type 2} \qquad \text{First condition;}$$

$$0 \le ((x1-x2)^2 + (y1-y2)^2) \le \delta d \qquad \text{Second condition;}$$

$$0 \le (\theta1-\theta2)^2 \le \delta t \qquad \text{Third condition;}$$

In the above conditions, δd and δt are parameters determined in the system. In addition, the distance evaluated in the second condition is generally called a two-dimensional Euclidean distance or an l2 norm. Likewise, the distance evaluated in the third condition is called a one-dimensional Euclidean distance. Hereinafter, these will collectively be called the Euclidean distance, and the Euclidean distance between D and D' will be expressed as d(D, D').

While the biometric authentication scheme in NPL 1 is the same as general schemes in which biometric information is not protected, biometric information of clients requesting authentication can be kept secret in the biometric authentication scheme in NPT 1. Specifically, whether minutiae match each other can be determined by using encryption protocols called Aided Computation and Set Intersection without revealing (type 2, (x2, y2), θ2) to a server.

PTL 2 discusses a ciphertext matching system in which data registered in a server is kept secret by introducing a trusted third party to the system.

PTL 3 discusses, in a system in which a trusted third party is introduced, a technique of reducing load on the third party in the matching processing. However, according to the technique discussed in PTL 3, when a Euclidean distance is used as a distance index, the size of registration target data increases in proportion to the fourth power of the allowable ambiguity index. To address this problem, in NPL 2, public key encryption called somewhat homomorphic encryption is used instead of homomorphic encryption. In this way, the size of registration target data is reduced to a size in the order of the square of the allowable ambiguity index.

PTL 4 discusses a technique in which the size of encrypted registration target data does not depend on the allowable ambiguity parameter and the load on a third party is light.

In addition, in NPL 3, the size of registration target data is reduced to a size that does not depend on the allowable ambiguity index.

PTL 1: Japanese Patent Kokai Publication No. JP-2006-158851A
PTL 2: International Publication No. 2014/185450
PTL 3: International Publication No. 2014/185447
PTL 4: International Publication No. 2012/114452
NPL 1: Siamak F. Shahandashti, Reihaneh Safavi-Naini, and Philip Ogunbona, "Private Fingerprint Matching", ACISP2012.

NPL 2: Higo, Isshiki, Mori, Obana, "A Private Fingerprint Matching Scheme with Small templates", Symposium on Cryptography and Information Security (SCIS2015), 2015.

NPL 3: Higo, Isshiki, Mori, Obana, "A Secure Biometric Authentication Scheme with Small Information Disclosure", Symposium on Cryptography and Information Security (SCIS2016), 2016.

SUMMARY

The disclosure of each of the above literatures is incorporated herein by reference thereto. The following analysis has been made by the present inventors.

The techniques disclosed in the above PTLs and NPLs have problems.

For example, the scheme in PTL 1 is known to have a problem of whether biometric information is protected with sufficient strength when biometric authentication is repeated many times.

In addition, while the authentication scheme in NPL 1 is the same as general schemes in which biometric information is not protected, biometric information of clients requesting authentication can be kept secret in the biometric authentication scheme in NPT 1. Specifically, whether minutiae match each other can be determined by using encryption protocols called Aided Computation and Set Intersection without revealing (type 2, (x2, y2), θ2) to a server. However, according to the technique in NPL 1, the load on the server in the matching processing is heavy. This is because the server needs to decrypt data transmitted from the client and re-encrypt the decryption result per matching processing. There is also a problem in that the data registered in the server is in plaintext.

As is the case with NPL 1, according to the technique disclosed in PTL 2, the load on the third party is heavy in the matching processing.

In the scheme in PTL 4, the distance between registered plaintext data and matching target plaintext data is revealed to the third party. If the third party attempts a fraudulent act, the third party can conduct an attack (a hill-climbing attack) by using the distance obtained in the matching processing. The third party can obtain the registered plaintext data and the matching target plaintext data efficiently.

In the scheme in NPL 3, the distance between the registered plaintext data and the matching target plaintext data is not revealed to the third party. However, in the scheme in NPL 3, the calculation costs of the user, the server, and the third party in the matching processing depend on the index of the ambiguity in which the size of registration target data is allowed. Thus, when the index of the ambiguity in which the size of registration target data is allowed is large, efficient processing is not performed.

As described above, according to the related techniques, most of the calculation amount in the matching processing depends on the allowable ambiguity parameter or similarity is revealed to the third party.

It is an object of the present invention to provide a ciphertext matching system and a ciphertext matching method in which the size of registration target data does not depend on the allowable ambiguity parameter, the distance between registered data and matching target data is not revealed, and most of the matching processing does not depend on the allowable ambiguity parameter.

According to a first aspect of the present invention, there is provided a ciphertext matching system, including: a registration target data generation apparatus that generates a ciphertext(s) of registered data; a matching request apparatus that requests matching of matching target data against the registered data; a data matching apparatus that generates a first-distance-related ciphertext in which a first distance between the registered data and the matching target data is kept secret by random numbers; and a matching support apparatus that generates a public key and a secret key and transmits the generated public key to the registration target data generation apparatus, the data matching apparatus, and the matching request apparatus; wherein the data matching apparatus transmits the first-distance-related ciphertext to the matching support apparatus; and wherein the matching support apparatus determines whether the first distance obtained by decrypting the first-distance-related ciphertext with the secret key is included in a set of second distances in which the registered data and the matching target data are allowable to be matched each other and transmits a result of the determination to the data matching apparatus.

According to a second aspect of the present invention, there is provided a ciphertext matching method, which is used in a ciphertext matching system including a registration target data generation apparatus that generates a ciphertext (s) of registered data, a matching request apparatus that requests matching of matching target data against the registered data, a data matching apparatus that matches the matching target data against the registered data, and a matching support apparatus that generates a public key and a secret key and transmits the generated public key to the registration target data generation apparatus, the data matching apparatus, and the matching request apparatus, the ciphertext matching method comprising:

causing the data matching apparatus to generate a first-distance-related ciphertext in which the first distance between the registered data and the matching target data is kept secret by random numbers; and causing the matching support apparatus to determine whether the first distance obtained by decrypting the first-distance-related ciphertext with the secret key is included in a set of second distances in which the registered data and the matching target data are allowable to be matched each other and transmit a result of the determination to the data matching apparatus.

According to the individual aspects of the present invention, there are provided a ciphertext matching system and a ciphertext matching method in which a size of registration target data does not depend on an allowable ambiguity parameter, a distance between registered data and matching target data is not revealed, and most of the matching processing does not depend on the allowable ambiguity parameter.

PREFERRED MODES

Figure 1:
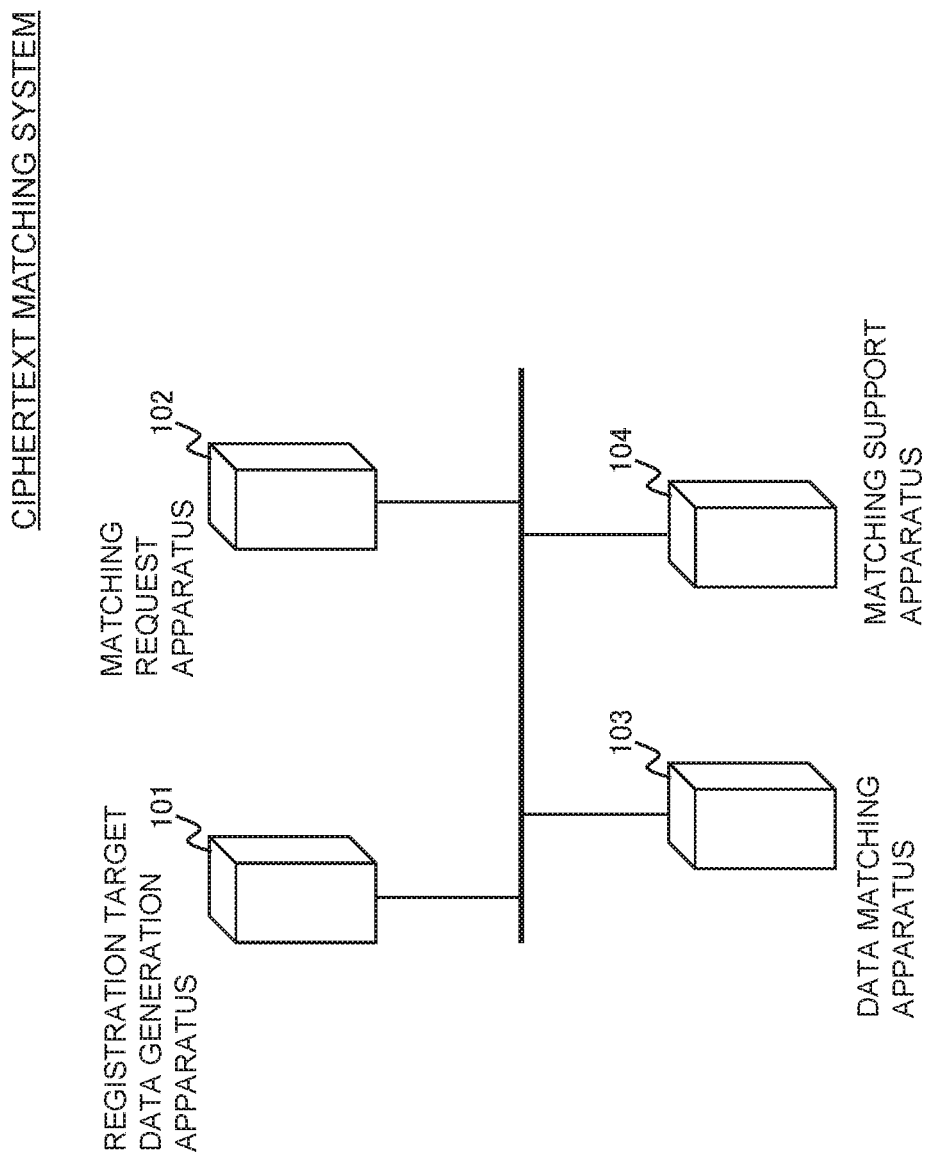
FIG. 1 illustrates an outline of an exemplary embodiment.

First, an outline of an exemplary embodiment will be described. Reference characters in the following outline denote various elements for the sake of convenience and are used as examples to facilitate understanding of the present invention. Namely, the description of the outline is not intended to indicate any limitations.

A ciphertext matching system according to an exemplary embodiment includes a registration target data generation apparatus 101, a matching request apparatus 102, a data matching apparatus 103, and a matching support apparatus 104 (see FIG. 1). The registration target data generation apparatus 101 generates a ciphertext(s) of registered data. The matching request apparatus 102 requests matching of matching target data against the registered data. The data matching apparatus 103 generates a first-distance-related ciphertext in which a first distance between the registered data and the matching target data is kept secret by random numbers. The matching support apparatus 104 generates a public key and a secret key and transmits the generated public key to the registration target data generation apparatus 101, the data matching apparatus 103, and the matching request apparatus 102. The data matching apparatus 103 transmits the first-distance-related ciphertext to the matching support apparatus 104. The matching support apparatus 104 determines whether the first distance obtained by decrypting the first-distance-related ciphertext with the secret key is included in a set of second distances in which the registered data and the matching target data are allowable to be matched each other and transmits a result of the determination to the data matching apparatus 103.

In the ciphertext matching system according to the above exemplary embodiment, by keeping the distance between the registered data and the matching target data secret, security is ensured. In addition, since most of the matching processing does not depend on an allowable ambiguity parameter, the calculation time in the matching processing can be reduced. Namely, there is provided a system in which the actual distance between data is kept secret and information about the distance is not leaked. In addition, in this system, most of the matching processing does not depend on the allowable ambiguity parameter.

Hereinafter, a specific exemplary embodiment(s) will be described in more detail with reference to drawings. In the individual exemplary embodiment(s), like elements are denoted by like reference characters, and description thereof will be omitted. An individual connection line between blocks in an individual drawing signifies both one-way and two-way directions. An individual arrow schematically illustrates the principal flow of a signal (data) and does not exclude bidirectionality.

First Exemplary Embodiment

A first exemplary embodiment will be described in more detail with reference to drawings.

Figure 2:
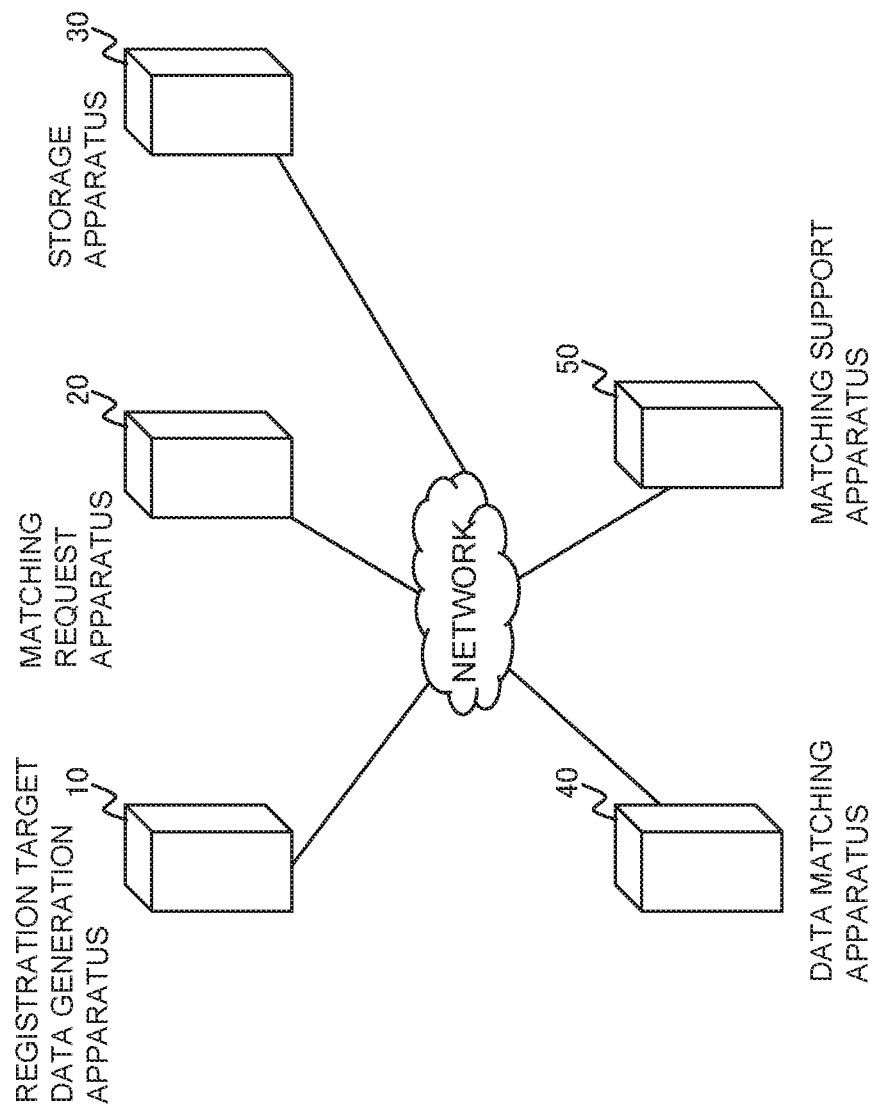
FIG. 2 illustrates an example of an overall configuration of a ciphertext matching system according to a first exemplary embodiment.

FIG. 2 illustrates an example of an overall configuration of a ciphertext matching system according to a first exemplary embodiment. As illustrated in FIG. 2, the ciphertext matching system includes a registration target data generation apparatus 10, a matching request apparatus 20, a storage apparatus 30, a data matching apparatus 40, and a matching support apparatus 50.

The registration target data generation apparatus 10 is an apparatus that generates a ciphertext(s) of registered data. The matching request apparatus 20 is an apparatus that requests the data matching apparatus 40 to match matching target data against the registered data.

The storage apparatus 30 is an apparatus that holds the registered data.

The data matching apparatus 40 is an apparatus that processes a data matching request from the matching request apparatus 20. In this operation, the data matching apparatus 40 generates a first-distance-related ciphertext in which a distance (a first distance) between the registered data and the matching target data is kept secret by using random numbers and uses this ciphertext for the data matching. Details of this ciphertext, etc. will be described below.

The matching support apparatus 50 is an apparatus that supports the data matching processing performed by the data matching apparatus 40. For example, the matching support apparatus 50 generates a public key and a secret key and transmits the generated public key to the registration target data generation apparatus 10, the data matching apparatus 40, and the matching request apparatus 20.

Figure 3:
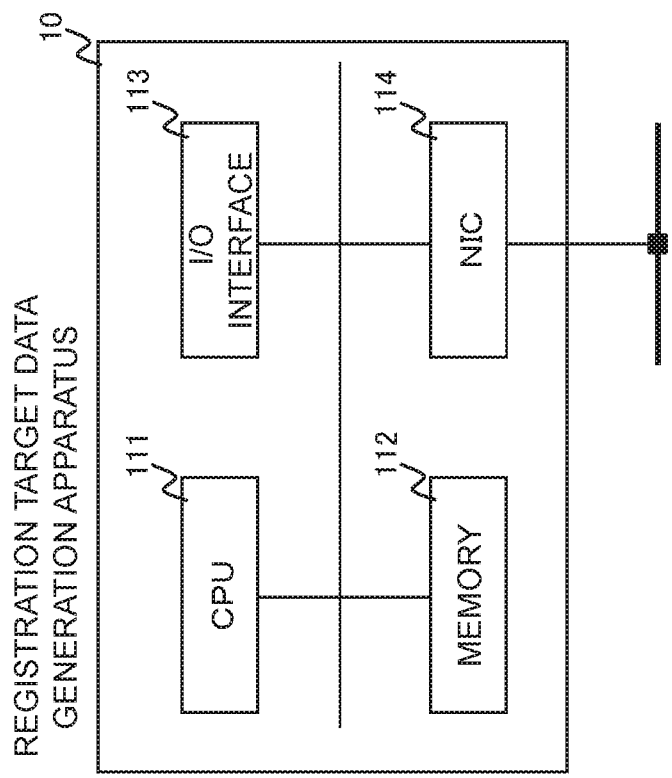
FIG. 3 is a block diagram illustrating an example of a hardware configuration of a registration target data generation apparatus according to the first exemplary embodiment.

Before detailed functions of the individual apparatuses illustrated in FIG. 2 are described, hardware configurations of the apparatuses will be described. FIG. 3 is a block diagram illustrating an example of a hardware configuration of the registration target data generation apparatus 10 according to the first exemplary embodiment. The registration target data generation apparatus 10 can be formed as a so-called information processing apparatus (a computer) and has a configuration illustrated as an example in FIG. 3. For example, the registration target data generation apparatus 10 includes a central processing unit (CPU) 111, a memory 112, an input-output interface 113, and a network interface card (NIC) 114 serving as communication means, which are connected to each other via an internal bus.

The hardware configuration of the registration target data generation apparatus 10 is not limited to that illustrated in FIG. 3. The registration target data generation apparatus 10 may include hardware not illustrated. The number of CPUs, etc. included in the registration target data generation apparatus 10 is not limited to the example illustrated in FIG. 3. For example, a plurality of CPUs may be included in the registration target data generation apparatus 10.

The memory 112 is a random access memory (RAM), a read-only memory (ROM), or an auxiliary storage device (a hard disk, etc.).

The input-output interface 113 is means serving as an interface connected to a display apparatus or an input apparatus not illustrated. The display apparatus is, for example, a liquid crystal display or the like. The input apparatus is, for example, an apparatus that receives user operations, such as a keyboard or a mouse.

Functions of the registration target data generation apparatus 10 are realized by processing modules that will be described below. The processing modules are realized by, for example, causing the CPU 111 to execute a program stored in the memory 112. In addition, this program can be updated by downloading an updated program via a network or by using a storage medium holding an updated program. The above processing modules may be realized by a semiconductor chip. Namely, any means of executing the functions of the processing modules by using hardware and/or software may be used.

Since the other apparatuses included in the ciphertext matching system have the same hardware configuration as that of the registration target data generation apparatus 10, description thereof will be omitted.

Next, the processing (processing modules) of the individual apparatuses that constitute the ciphertext matching system will be described.

Figure 4:
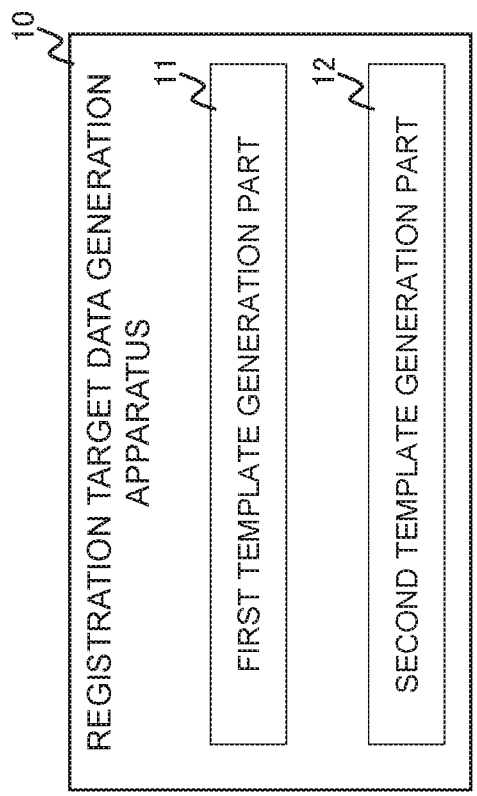
FIG. 4 illustrates an example of a processing configuration of the registration target data generation apparatus.

FIG. 4 illustrates an example of a processing configuration of the registration target data generation apparatus 10. As illustrated in FIG. 4, the registration target data generation apparatus 10 includes a first template generation part 11 and a second template generation part 12.

The first template generation part 11 is means of generating a first template by using data (registration target data) that the user has entered and wishes to register and the public key generated by the matching support apparatus 50 described below.

The second template generation part 12 is means of generating a second template by using the data that the user has entered and wishes to register and the public key generated by the matching support apparatus 50 described below and transmitting the set of the first template and the second template to the storage apparatus 30.

Figure 5:
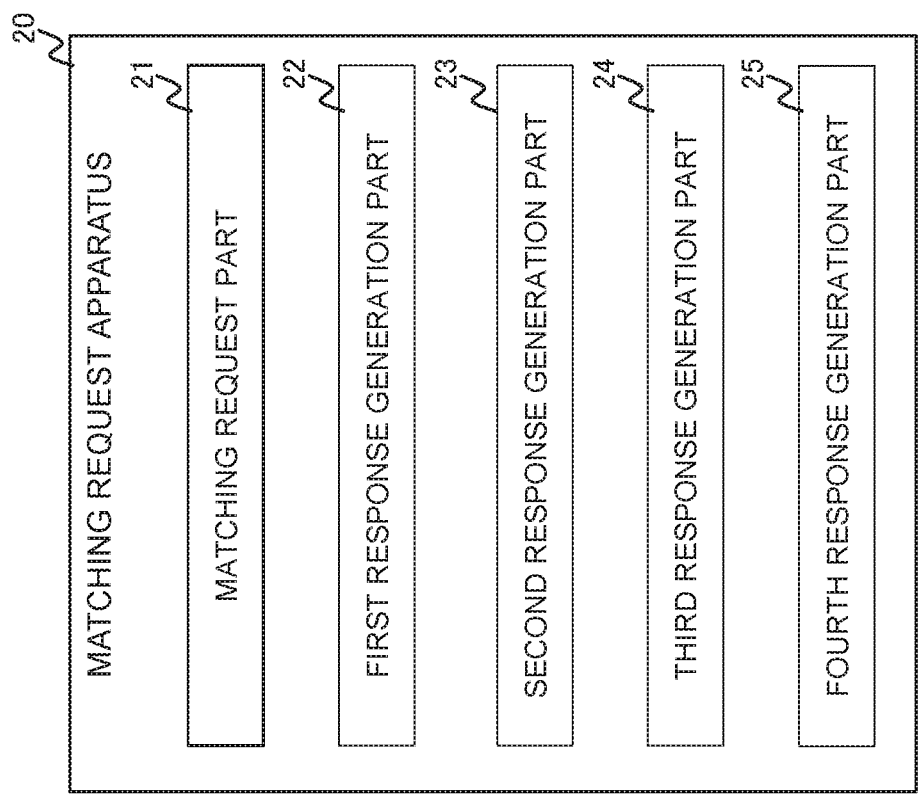
FIG. 5 illustrates an example of a processing configuration of a matching request apparatus.

FIG. 5 illustrates an example of a processing configuration of the matching request apparatus 20. As illustrated in FIG. 5, the matching request apparatus 20 includes a matching request part 21, a first response generation part 22, a second response generation part 23, a third response generation part 24, and a fourth response generation part 25.

The matching request part 21 is means of receiving data (matching target data) that the user has entered and wishes to match against the registered data and an identifier generated by the storage apparatus 30 described below and transmitting a matching request to the data matching apparatus 40.

The first to fourth response generation parts 22 to 25 are means of generating first to fourth responses, respectively, by using first to third challenges transmitted from the data matching apparatus 40 in response to a matching request from the matching request part 21 and the public key transmitted from the matching support apparatus 50 and transmitting the first to fourth responses to the data matching apparatus 40.

Figure 6:
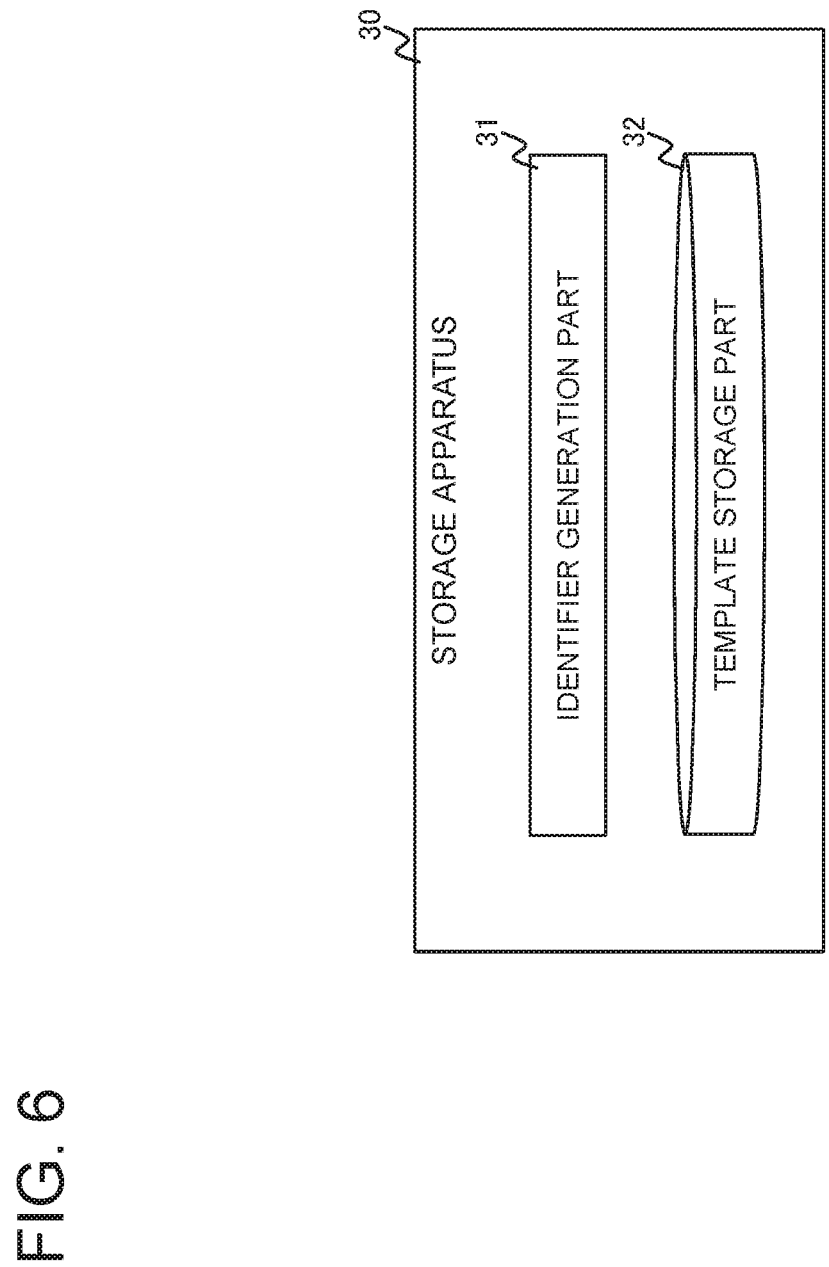
FIG. 6 illustrates an example of a processing configuration of a storage apparatus.

FIG. 6 illustrates an example of a processing configuration of the storage apparatus 30. As illustrated in FIG. 6, the storage apparatus 30 includes an identifier generation part 31 and a template storage part 32.

The identifier generation part 31 is means of generating an identifier unique to (first template, second template) transmitted from the registration target data generation apparatus 10 and storing (identifier, (first template, second template)) in the template storage part 32.

Figure 7:
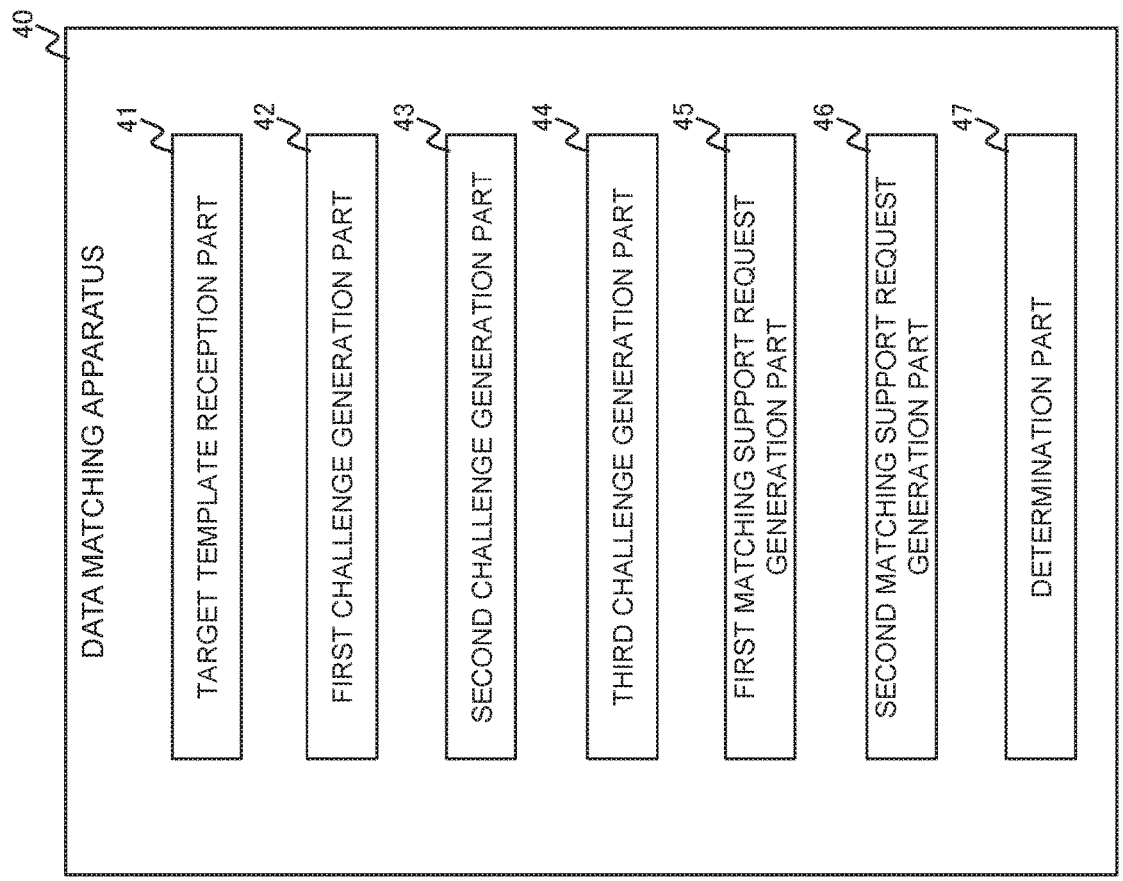
FIG. 7 illustrates an example of a processing configuration of a data matching apparatus.

FIG. 7 illustrates an example of a processing configuration of the data matching apparatus 40. As illustrated in FIG. 7, the data matching apparatus 40 includes a target template reception part 41, a first challenge generation part 42, a second challenge generation part 43, a third challenge generation part 44, a first matching support request generation part 45, a second matching support request generation part 46, and a determination part 47.

The target template reception part 41 is means of receiving a matching target template(s) from the template storage part 32 in the storage apparatus 30 in response to a matching request transmitted from the matching request apparatus 20.

The first to third challenge generation parts 42 to 44 are means of generating the first to third challenges, respectively, from the received matching target template(s) and the public key generated by the matching support apparatus 50 and transmitting these challenges (first challenge, second challenge, third challenge) to the matching request apparatus 20.

The first and second matching support request generation parts 45 and 46 are means of generating first and second matching support requests, respectively, from (first response, second response, third response, fourth response) generated and transmitted by the matching request apparatus 20 in response to the above challenges (first challenge, second challenge, third challenge) and the public key generated by the matching support apparatus 50 and transmitting these support requests (first matching support request, second matching support request) to the matching support apparatus 50.

The determination part 47 is means of receiving a matching support result generated by the matching support apparatus 50 in response to the above support requests (first matching support request, second matching support request) and generating a determination result.

Figure 8:
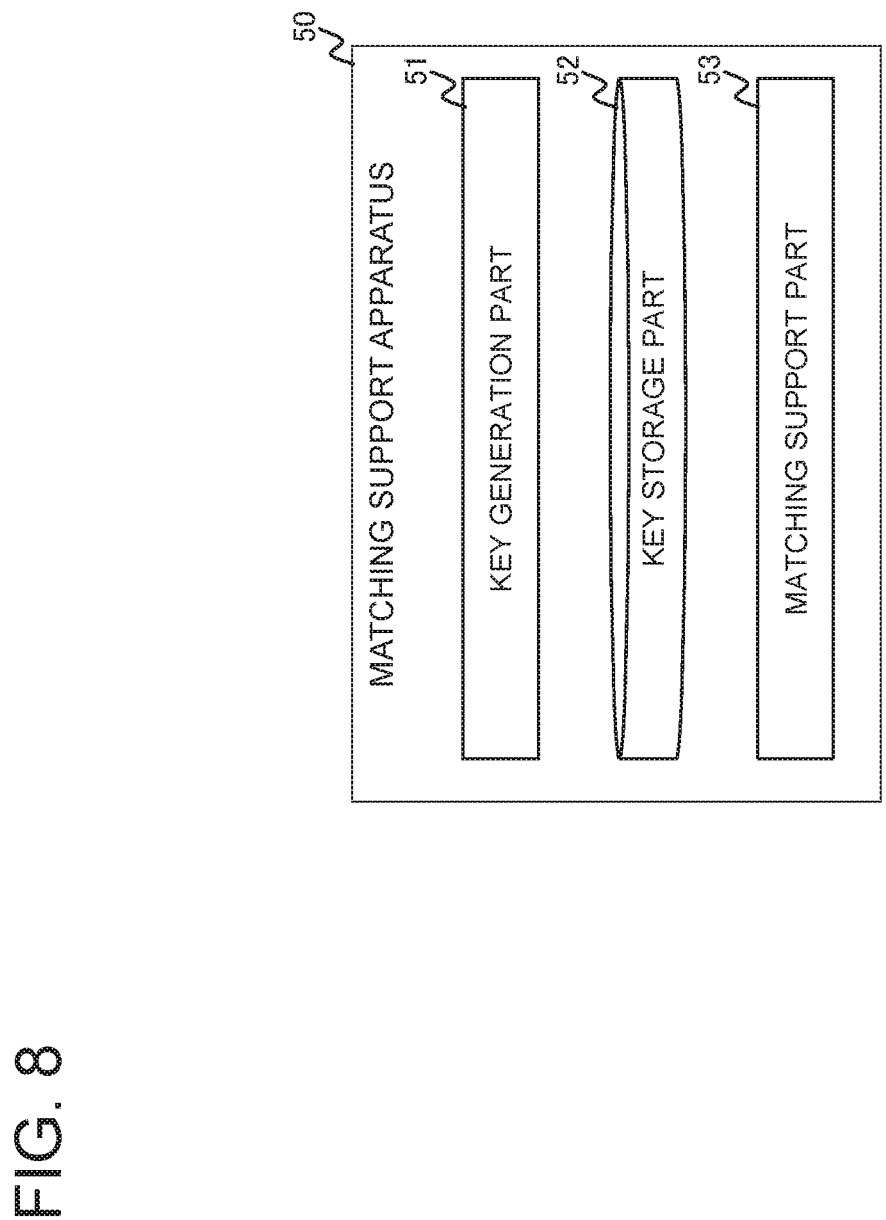
FIG. 8 illustrates an example of a processing configuration of a matching support apparatus.

FIG. 8 illustrates an example of a processing configuration of the matching support apparatus 50. As illustrated in FIG. 8, the matching support apparatus 50 includes a key generation part 51, a key storage part 52, and a matching support part 53.

The key generation part 51 is means of receiving a security parameter that specifies a key size, etc. and generating a secret key and a public key. The key generation part 51 stores the generated secret key in the key storage part 52 and transmitting the generated public key to the registration target data generation apparatus 10, the matching request apparatus 20, and the data matching apparatus 40.

The matching support part 53 is means of receiving the support requests (first matching support request, second matching support request) transmitted from the data matching apparatus 40, generating a matching support result by using the secret key stored in the key storage part 52, and transmitting the matching support result to the data matching apparatus 40.

[Description of System Operation]

Next, operations of the ciphertext matching system according to the first exemplary embodiment will be described in detail.

The operations of the ciphertext matching system according to the first exemplary embodiment are basically classified into three phases of a set-up phase, a data registration phase, and a ciphertext matching phase.

In the set-up phase, a security parameter is entered to the matching support apparatus 50, and a public key and a secret key based on additive homomorphic encryption are generated.

In the data registration phase, registration target data is entered to the registration target data generation apparatus 10 to generate templates, and the templates are registered in the storage apparatus 30.

In the ciphertext matching phase, while keeping the matching target data entered to the matching request apparatus 20 secret, the data matching apparatus 40 determines whether the matching target data is close to the corresponding registered data stored in the storage apparatus 30 (whether a certain kind of distance is small).

Hereinafter, operations in the individual phases will be described in detail with reference to drawings.

[Set-Up Phase]

Figure 9:
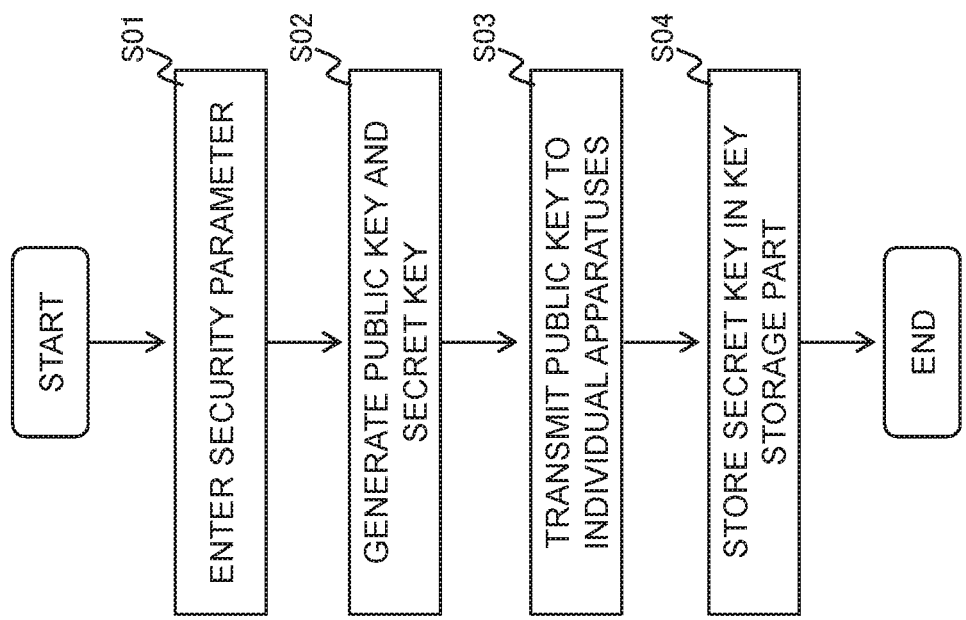
FIG. 9 is a flowchart illustrating an example of an operation of the ciphertext matching system in a set-up phase.

FIG. 9 is a flowchart illustrating an example of an operation of the ciphertext matching system in the set-up phase.

First, a system administrator or the like enters a security parameter to the matching support apparatus 50 (step S01).

When receiving the security parameter, the key generation part 51 in the matching support apparatus 50 generates a public key and a secret key based on additive homomorphic encryption (step S02).

Next, the key generation part 51 transmits the public key to the registration target data generation apparatus 10, the matching request apparatus 20, and the data matching apparatus 40 (step S03).

In addition, the key generation part 51 stores the generated secret key in the key storage part 52 (step S04).

[Data Registration Phase]

Figure 10:
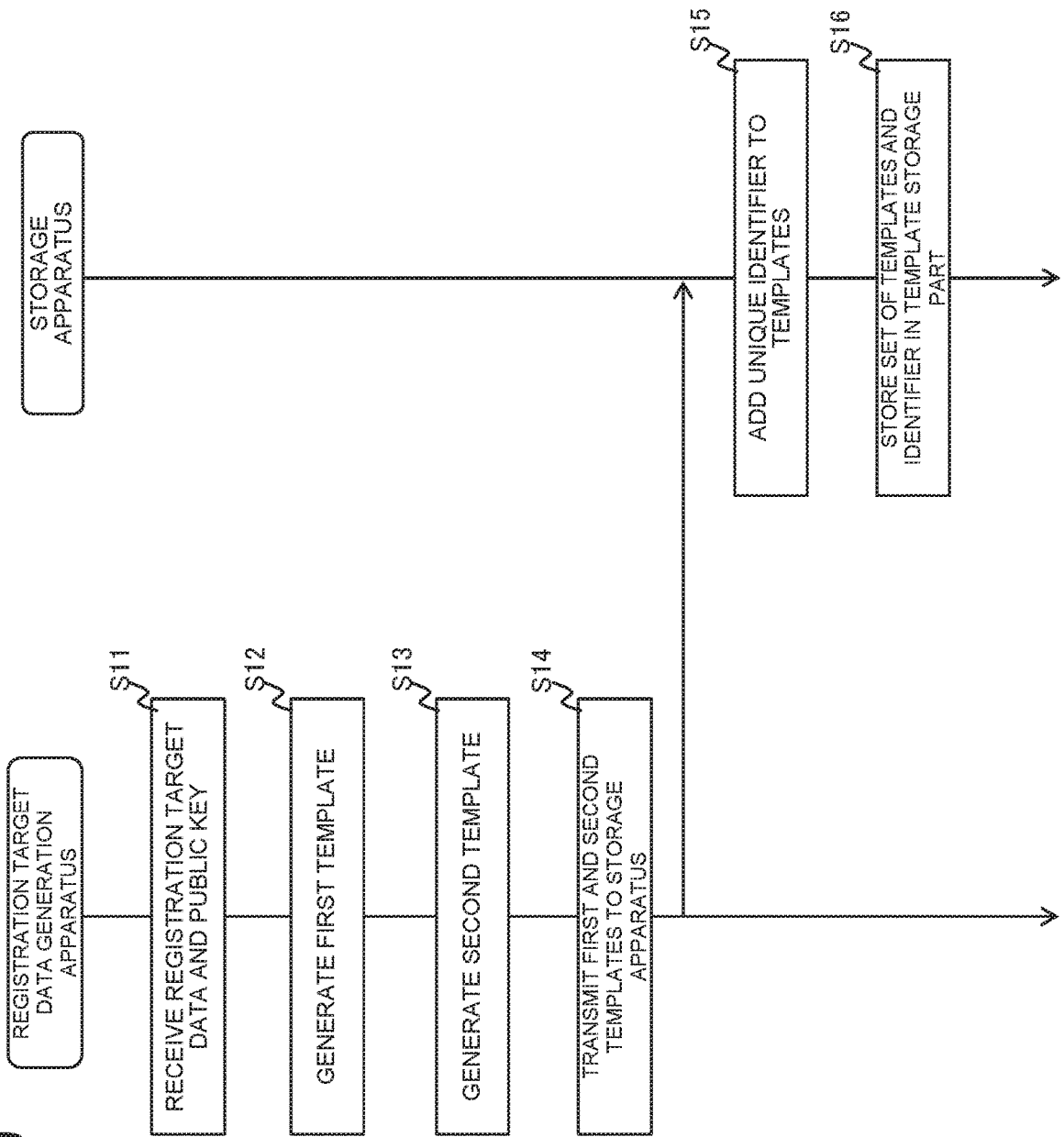
FIG. 10 is a sequence diagram illustrating an example of an operation of the ciphertext matching system in a data registration phase.

FIG. 10 is a sequence diagram illustrating an example of an operation of the ciphertext matching system in the data registration phase.

First, the registration target data generation apparatus 10 receives registration target data and the public key from the matching support apparatus 50 (step S11).

Next, the first template generation part 11 receives the registration target data and the public key and generates a first template (step S12). Likewise, the second template generation part 12 receives the registration target data and the public key and generates a second template (step S13). The registration target data generation apparatus 10 transmits the generated (first template, second template) to the storage apparatus 30 (step S14).

Next, the identifier generation part 31 in the storage apparatus 30 receives the above templates (first template, second template) and adds a unique identifier to the templates (step S15). In addition, the identifier generation part 31 stores the set of the above templates and the identifier in the template storage part 32 (step S16).

[Ciphertext Matching Phase]

Figure 11:
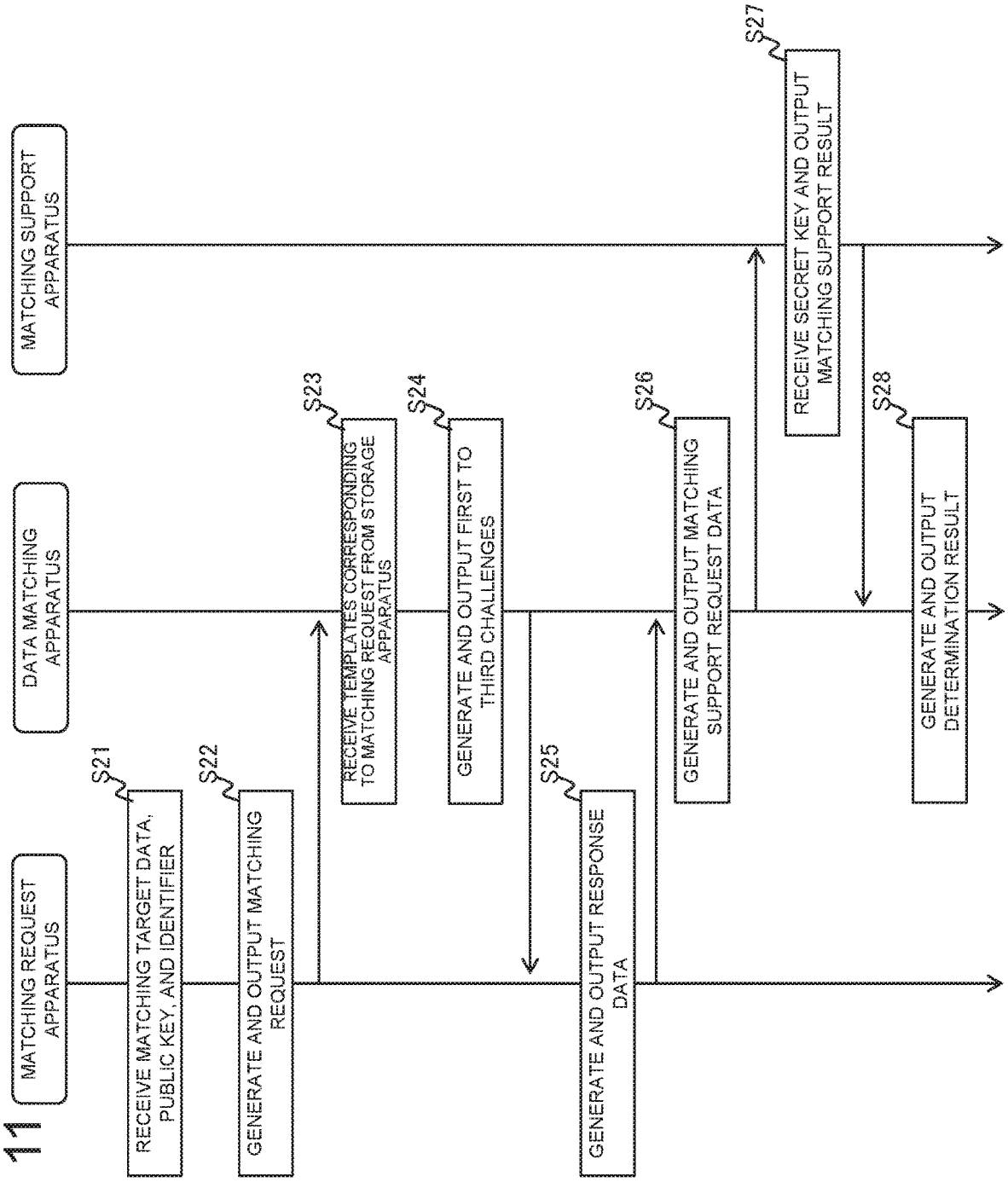
FIG. 11 is a sequence diagram illustrating an example of an operation of the ciphertext matching system in a ciphertext matching phase.

FIG. 11 is a sequence diagram illustrating an example of an operation of the ciphertext matching system in the ciphertext matching phase.

First, the matching request part 21 in the matching request apparatus 20 receives matching target data, the public key, and the identifier of the templates against which the user wishes to match the input data (the matching target data) (step S21). Next, the matching request part 21 generates a matching request by using the received data and outputs the matching request to the data matching apparatus 40 (step S22).

Next, when receiving the matching request, the target template reception part 41 in the data matching apparatus 40 receives the templates corresponding to the identifier in the request from the storage apparatus 30 (step S23).

Next, when receiving the templates, the first to third challenge generation parts 42 to 44 generate a first challenge, a second challenge, and a third challenge and outputs the generated challenges to the matching request apparatus 20 (step S24). Hereinafter, (first challenge, second challenge, third challenge) will collectively be referred to as "challenge data".

When receiving the challenge data, the first response generation part 22, the second response generation part 23, the third response generation part 24, and the fourth response generation part 25 in the matching request apparatus 20 generate a first response, a second response, a third response, and a fourth response, respectively, by using the challenge data and the public key as input data and output the generated responses to the data matching apparatus 40 (step S25). Hereinafter, (first response, second response, third response, fourth response) will collectively be referred to as "response data".

When receiving the matching target data (the response data), the first matching support request generation part 45 and the second matching support request generation part 46 in the data matching apparatus 40 generate and transmit a first matching support request and a second matching support request, respectively, to the matching support apparatus 50 (step S26). Hereinafter, (first matching support request, second matching support request) will collectively be referred to as "matching support request data".

When receiving the matching support request data, the matching support part 53 in the matching support apparatus 50 receives the secret key from the key storage part 52, generates a matching support result, and transmits the matching support result to the data matching apparatus 40 (step S27).

When receiving the matching support result, the determination part 47 in the data matching apparatus 40 generates and outputs a determination result (step S28).

Specific Example

Next, a specific example according to the first exemplary embodiment will be described.

In the preset specific example, a case in which an n-dimensional Euclidean distance is handled as a distance will be described. Namely, regarding two n-dimensional vectors $X=(x[1], x[2], \ldots, x[n])$ and $Y=(y[1], y[2], \ldots, y[n])$, the distance $(X, Y)$ between X and Y is defined as $d(X, Y)=\sqrt{((x[1]-y[1])^{2}+(x[2]-y[2])^{2}+ \ldots +(x[n]-Y[n])^{2})}$.

When $d(X, Y)$ is equal to or less than a threshold t, X is determined to be close (similar) to Y. When $d(X, Y)$ is larger than the threshold t, X is determined to be far from (not similar to) Y. Note that the relationship $0 \{d(X, Y)\}^{2} \leq t^{2}$ when $d(X, Y) \leq t$. Namely, when $\{d(X, Y)\}^{2}$ is equal to or less than threshold $t^{2}=T$, X is determined to be close to Y. When $\{d(X, Y)\}^{2}$ is larger than T, X is determined to be far from Y.

In the present specific example, when X is close to Y, X and Y are determined to match each other. When X is far from Y, X and Y are determined to be mismatched from each other. In addition, in the present specific example, additive homomorphic encryption (for example, modified elliptic Elgamal encryption, etc.) is used. Subsequently, in the present specific example, while a case in which modified elliptic Elgamal encryption is used as additive homomorphic encryption is used, other additive homomorphic encryption such as additive Elgamal encryption or Paillier encryption may be used.

First, modified elliptic Elgamal encryption will be described. The modified elliptic Elgamal encryption is public key encryption modified to add an additive homomorphic property to elliptic Elgamal encryption. The modified elliptic Elgamal encryption is constituted by three algorithms of key generation, encryption, and decryption. Each of the algorithms will be described below.

[Key Generation Algorithm]
(1) A security parameter $1^k$ is received.
(2) A group G whose order is a k-bit prime p is randomly selected from an elliptic curve. The generator (a point on the elliptic curve) of G is g.
(3) x is randomly selected from values 1 to p−1, and h=[x]g is set, in which [x]g signifies the product of the point g on the elliptic curve and x. H is also a point on the elliptic curve.
(4) A public key pk=((g, G), p, g, h) and a secret key sk=(x) are outputted.

For simplicity, unless otherwise stated, the following description assumes that (g, G) and p are shared by the individual entities and that the public key pk will be simply expressed as pk=(g, h).

[Encryption Algorithm]
(1) pk=(g, h) and a message m∈$Z^*\_p$ are received as input data. $Z^*\_p$ signifies the set {1, 2, . . . , p−1}.
(2) M=[m]g
(3) r∈$Z^*\_p$ is randomly selected.
(4) C[0]=[r]g, and C[1]=M+[r]h.
(5) Ciphertexts (C[0], C[1]) are outputted.

Processing for encrypting the message m by using the public key pk will be expressed as Enc(pk, m).

[Decryption Algorithm]
(1) sk=(x) and ciphertexts (C[0], C[1]) are received as input data.
(2) C[1]−[x]C[0]=M+[r]h−[x]([r]g)=M Processing for decrypting ciphertexts C=(C[0], C[1]) by using the secret key sk will be expressed as Dec(sk, C).

As a result of step (2) in the encryption algorithm, the decryption result M indicates [m]g. From here, to calculate m, a discrete logarithm problem on an elliptic curve needs to be solved. While a decryption algorithm is originally for calculating m, since it is only sufficient to calculate M herein, encryption obtained by modifying the decryption algorithm as described above will be referred to as modified elliptic Elgamal encryption.

The above modified elliptic Elgamal encryption satisfies an additive homomorphic property. Namely, in the case of two ciphertexts (C[0]=[r_1]g, C[1]=[m_1]g+[r_1]h) and (C'[0]=[r_2]g, C'[1]=[m_2]g+[r_2]h), the following relationship is established: (C"[0]=C[0]+C'[0]=[r_1+r_2]g, C"[1]=C[1]+C'[1]=[m_1+m_2]g+[r_1+r_2]h). Likewise, constant multiplication can be calculated as follows, without decrypting encrypted data. In the case of (C[0]=[r__1]g, C[1]=[m_1]g+[r_1]h) and a ∈$Z^*\_p$, the following relationship is established: (C'[0]=[a]C[0]=[a·r_1]g, C'[1]=[a]C[1]=[a·m_1]g+[a·r_1]h).

Hereinafter, an operation in each of the phases disclosed herein will be described in detail.

[Set-Up Phase]
When receiving a security parameter $1^{\{k\}}$ specifying the length of the decryption key and a parameter "param" including a threshold T, the key generation part 51 in the matching support apparatus 50 performs the key generation based on the modified elliptic Elgamal encryption, to generate a public key pk and a secret key sk. The key generation part 51 transmits (param, pk) to the registration target data generation apparatus 10, the matching request apparatus 20, and the data matching apparatus 40 and stores the secret key sk in the key storage part 52. The above operation of the matching support apparatus 50 corresponds to steps S01 to S04 in FIG. 9.

[Data Registration Phase]
First, registration target data X=(x[1], x[2], . . . , x[n]), which is to be kept secret, and the public key pk are entered to the registration target data generation apparatus 10 (step S11 in FIG. 10).

Next, the first template generation part 11 receives the registration target data X and the public key pk and generates and outputs a first template in accordance with the following procedure (step S12 in FIG. 10).
(1) The first template generation part 11 calculates Enc(pk, x[i]) in which i=1, . . . , n.
(2) The first template generation part 11 outputs a set of results of the above (1) {Enc(pk, x[i])} as a first template.

Next, the second template generation part 12 generates a second template (step S13 in FIG. 10). Specially, the second template generation part 12 calculates the following (1) to obtain a second template.
(1) Enc(pk, $\Sigma\_{\{i=1, \ldots, n\}}$ (x_i)^2)

The two templates (first template, second template) are transmitted to the storage apparatus 30 (step S14 in FIG. 10).

Next, when receiving the templates, the identifier generation part 31 in the storage apparatus 30 adds a unique identifier ID to the templates (step S15 in FIG. 10) and stores the set of the templates and the identifier (ID, template) in the template storage part 32 (step S16).

[Ciphertext Matching Phase]
First, the matching request part 21 in the matching request apparatus 20 receives matching target data Y=(y[1], y[2], . . . , y[n]), the public key pk, and the identifier ID of the template against which the input data is matched and outputs a matching request "request" (steps S21 and S22 in FIG. 11). The present example assumes that the matching request "request" includes the identifier ID or information about the identifier ID.

Next, when receiving the matching request "request", the target template reception part 41 in the data matching apparatus 40 receives the templates (ID, (first template, second template)) corresponding to the identifier ID in the request from the storage apparatus 30 (step S23).

When receiving the above templates (first template, second template) and the public key pk, the first challenge generation part 42 generates and outputs a first challenge in accordance with the following procedure (step S24 in FIG. 11).
(1) The first challenge generation part 42 selects random numbers R_1, R_2, R_3, and R_4 from $Z^*\_p$. R_2=R_1·R_3 mod p. R_1 is transmitted to the second challenge generation part 43, and R_2, R_3, and R_4 are transmitted to the third challenge generation part 44. $R\_3^{\{-1\}}$ is transmitted to the first matching support request generation part 45.
(2) The first challenge generation part 42 calculates and outputs [R_1]g as a first challenge.

Next, when receiving the above templates (first template, second template), the public key pk, and the random number R_1, the second challenge generation part 43 generates and outputs a second challenge in accordance with the following calculation (1) (step S24 in FIG. 11).
(1) The second challenge generation part 43 calculates and outputs {Enc(pk, R_1·x[i])} in which i=1, . . . , n, as a second challenge.

Next, when receiving the above templates (first template, second template), the public key pk, and the random numbers R_2, R_3, and R_4, the third challenge generation part 44 generates a third challenge in accordance with the following procedure and outputs challenge data (step S24 in FIG. 11).

(1) The third challenge generation part 44 calculates Enc(pk, $R\_2 \cdot \Sigma\_\{i=1, \ldots, n\} (x\_i)^2 + R\_3 \cdot R\_4$) as a third challenge.
(2) The third challenge generation part 44 transmits (first challenge, second challenge, third challenge) to the matching request apparatus 20 as challenge data.

As described above, by using the ciphertext (two templates) of registered data and the public key transmitted from the matching support apparatus 50, the data matching apparatus 40 generates a plurality of challenges and transmits the generated challenges to the matching request apparatus 20. In addition, one challenge (second challenge) of the plurality of challenges generated by the data matching apparatus 40 is masked (kept secret) by the random number $R\_1$, and another challenge (third challenge) is masked by the random numbers $R\_2$ and $R\_3$. The product of the random numbers $R\_1$ and $R\_3$ matches the random number $R\_2$.

When receiving the above challenge data, the first response generation part 22 in the matching request apparatus 20 generates a first response in accordance with the following procedure by using the public key pk as input data and outputs the first response (step S25 in FIG. 11).
(1) The first response generation part 22 randomly selects $R\_C \in Z^*\_p$ and transmits the randomly selected $R\_C$ to the second response generation part 23 and the third response generation part 24.
(2) The first response generation part 22 calculates and outputs $[R\_C]g$ as a first response.

By using the challenge data, the public key pk, and the random number $R\_C$ as input data, the second response generation part 23 generates a second response in accordance with the following procedure and outputs the second response (step S25 in FIG. 11).
(1) The second response generation part 23 calculates $[R\_C \cdot R\_1]g$ from the first challenge ($[R\_1]g$), randomly selects a random number $r\_1 \in Z^*\_p$, and calculates ($[r\_1]g, [R\_C \cdot R\_1]g + [r\_1]h$). Since this is a ciphertext of the plaintext $R\_C \cdot R\_1$, this will hereinafter be expressed as Enc(pk, $R\_C \cdot R\_1$) for simplicity. By performing homomorphic constant multiplication, the second response generation part 23 calculates Enc(pk, $R\_C \cdot R\_1 \cdot \Sigma\_\{i=1, \ldots, n\} (y\_i)^2$).
(2) The second response generation part 23 performs homomorphic constant multiplication to multiply Enc(pk, $R\_1 \cdot x\_i$) of the second challenge {Enc(pk, $R\_1 \cdot x\_i$)} by $-2R\_C \cdot y\_i$. Namely, the second response generation part 23 calculates Enc(pk, $-2R\_C \cdot R\_1 \cdot x\_i \cdot y\_i$). In addition, the second response generation part 23 performs homomorphic addition on all the encrypted data, to calculate Enc(pk, $-2R\_C \cdot R\_1 \Sigma\_\{i=1, \ldots, n\} (x\_i \cdot y\_i)$).
(3) The second response generation part 23 randomly selects and transmits $R \in Z^*\_p$ to the fourth response generation part 25.
(4) By performing homomorphic addition, the second response generation part 23 calculates Enc(pk, $R\_C \cdot R\_1 (\Sigma\_\{i=1, \ldots, n\} (y\_i)^2 - 2\Sigma\_\{i=1, \ldots, n\} x\_i \cdot y\_i) + R$). The second response generation part 23 can calculates the "+R" part by encrypting R and performing homomorphic addition on R. The calculation result is outputted as a second response.

By using the challenge data, the public key pk, and the random number $R\_C$ as input data, the third response generation part 24 generates a third response in accordance with the following procedure (1) and outputs the generated third response (step S25 in FIG. 11).
(1) The third response generation part 24 multiplies the third challenge Enc(pk, $R\_2 \cdot \Sigma\_\{i=1, \ldots, n\} (x\_i)^2 + R\_3 \cdot R\_4$) by $R\_C$ through homomorphic constant multiplication. Namely, the third response generation part 24 generates Enc(pk, $R\_C(R\_2 \cdot \Sigma\_\{i=1, \ldots, n\} (x\_i)^2 + R\_3 \cdot R\_4)$), and the calculation result is outputted as a third response.

The first to third responses are information used by the data matching apparatus 40 to generate a ciphertext about the distance between the registered data (registered plaintext data) and the matching target data (plaintext data to be matched).

By using the public key pk, the parameter including the threshold T, a random number R, the first response, the second response, and the third response as input data, the fourth response generation part 25 generates a fourth response in accordance with the following procedure (step S25 in FIG. 11).
(1) The fourth response generation part 25 calculates $[R]g$.
(2) The fourth response generation part 25 calculates $H([R]g + [i \cdot R\_C \cdot R\_1]g)$ in which $i=0, \ldots, T$, by using a hash function H. The fourth response generation part 25 can calculate $[i \cdot R\_C \cdot R\_1]g$ by using the first response.
(3) The fourth response generation part 25 obtains $\{H([R + i \cdot R\_C \cdot R\_1]g)\} \{i=0, \ldots, T\}$ as a fourth response.
(4) The fourth response generation part 25 transmits (first response, second response, third response, fourth response) to the data matching apparatus 40 as response data.

The fourth response indicates a set of hash values of values that can be taken by the distance between the registered data and the matching target data when the distance is within a threshold range in which the registered data and the matching target data are allowable to be matched each other.

As described above, the matching request apparatus 20 generates a plurality of responses by using a plurality of challenges transmitted from the data matching apparatus 40, the public key transmitted from the matching support apparatus 50, and the random number and transmits the plurality of responses to the data matching apparatus 40.

When receiving the response data and the random numbers $R\_3^\{-1\}$ and $R\_4$, the first matching support request generation part 45 in the data matching apparatus 40 generates a first matching support request in accordance with the following procedure and outputs the generated first matching support request (step S26 in FIG. 11).
(1) By performing homomorphic constant multiplication, the first matching support request generation part 45 multiplies the third response Enc(pk, $R\_C(R\_2 \cdot \Sigma\_\{i=1, \ldots, n\} (x\_i)^2 + R\_3 \cdot R\_4)$) by $R\_3^\{-1\}$ to calculate Enc(pk, $R\_3^\{-1\} \cdot R\_C(R\_2 \cdot \Sigma\_\{i=1, \ldots, n\} (x\_i)^2 + R\_3 \cdot R\_4)$). As seen from the way the random numbers are created, since $R\_2 \cdot R\_3^\{-1\} = R\_1$, $R\_3 \cdot R\_3^\{-1\} = 1$, the result is Enc(pk, $R\_C(R\_1 \cdot \Sigma\_\{i=1, \ldots, n\} (x\_i)^2 + R\_4)$).
(2) From the first response $[R\_C]g$ and the random number $R\_4$, the first matching support request generation part 45 calculates Enc(pk, $R\_3^\{-1\} \cdot R\_C \cdot R\_1 \cdot \Sigma\_\{i=1, \ldots, n\} (x\_i)^2$) by performing homomorphic addition.
(3) By performing homomorphic addition between the second response Enc(pk, $R\_C \cdot R\_1(\Sigma\_\{i=1, \ldots, n\} (y\_i)^2 - 2\Sigma\_\{i=1, \ldots, n\} x\_i \cdot y\_i) + R$) and the above result (2), the first matching support request generation part 45 obtains Enc(pk, $R\_C \cdot R\_1 \, d(X, Y)^2 + R$). The first matching support request generation part 45 outputs the calculation result as a first matching support request.

This first matching support request corresponds to a ciphertext about the distance between the registered data and the matching target data. Namely, the first matching support request includes the information Enc(pk, $R\_C \cdot R\_1 \, d(X, Y)^2 + R$), which is equal to a ciphertext of a value obtained by adding the random number R to the product of the square of the Euclidean distance between the registered data (registered plaintext data) and the matching target data (plaintext data to be matched) and the random number R_C and the random number R_1. In this way, the data matching apparatus 40 transmits the ciphertext about the distance between the registered data and the matching target data to the matching support apparatus 50 as the first matching support request.

The second matching support request generation part 46 receives the response data and uses the fourth response as a second matching support request. Namely, the data matching apparatus 40 transmits the fourth response to the matching support apparatus 50 as the second matching support request. In this way, the data matching apparatus 40 transmits the matching support request data (first matching support request and second matching support request) to the matching support apparatus 50 (step S26 in FIG. 11).

When receiving the matching support request data, the matching support part 53 in the matching support apparatus 50 receives the secret key sk from the key storage part 52, decrypts the first matching support request, and obtains [R_C·R_1 d(X, Y)^2+R]g. In addition, the matching support part 53 calculates H([R_C·R_1 d(X, Y)^2+R]g). Next, if the calculation result (the calculated hash value) is included in the second matching support request, the matching support part 53 determines OK (success) and transmits the result to the data matching apparatus 40 as the matching support result. Otherwise, the matching support part 53 determines NG (failure) and transmits the result to the data matching apparatus 40 as the matching support result (step S27 in FIG. 11).

As described above, by decrypting the ciphertext as the first matching support request with the secret key stored in the key storage part 52, the matching support apparatus 50 acquires the distance (the distance between the registered data and the matching target data) kept secret by the random numbers. In addition, the matching support apparatus 50 calculates a hash value of the acquired distance. Next, the matching support apparatus 50 determines whether the calculated hash value of the distance is included in the second matching support request and transmits the determination result to the data matching apparatus 40.

After receiving the matching support result, the determination part 47 in the data matching apparatus 40 outputs "match" as the determination result if the result indicates OK. Otherwise, the determination part 47 outputs "mismatch" as the determination result (step S28 in FIG. 11). Namely, based on the determination result from the matching support apparatus 50, the data matching apparatus 40 outputs a determination result indicating whether the registered data and the matching target data match each other.

As described above, in the ciphertext matching system according to the first exemplary embodiment, the data matching apparatus 40 transmits a ciphertext about a distance between registered data and matching target data to the matching support apparatus 50. The matching support apparatus 50 determines whether a distance obtained by decrypting the ciphertext about the distance with a secret key is included in a set of distances in which the registered data and the matching target data are allowable to be matched each other and transmits a result of the determination to the data matching apparatus.

As a result, a system in which the actual distance between data is kept secret, information about the distance is not leaked, and most of the matching processing does not depend on the allowable ambiguity parameter is provided. Namely, by keeping the distance between the registered data and the matching target data secret, security is ensured. In addition, since most of the matching processing does not depend on the allowable ambiguity parameter, a ciphertext matching system needing a short calculation time in the matching processing can be provided.

The configuration and operations of the ciphertext matching system described in the above exemplary embodiment(s) and specific examples are only examples. Thus, various variations are possible. In addition, while a plurality of steps (processing) are sequentially listed in the plurality of flowcharts described above, the order of the steps performed in the above exemplary embodiment(s) is not limited to the order described above. In the exemplary embodiment(s), for example, individual processing may be performed in parallel. Namely, the order of the steps illustrated may be changed as long as the change does not cause a problem. In addition, the above exemplary embodiment(s) can be combined as long as the combination does not cause contradiction.

While the industrial applicability of the present invention is apparent from the above description, for example, the present invention is suitably applicable to biometric authentication using multivalued vectors as feature amounts. By considering data entered in the data registration phase and data entered in the ciphertext matching phase as feature amounts (feature vectors) obtained from biometric information acquired from fingerprints, veins, or the like, it becomes possible to determine whether encrypted biometric data stored in the storage apparatus and encrypted biometric data created from the matching request apparatus have been acquired from the same person while keeping the biometric information secret. This determination can be made by determining whether the distance between the two entered data is equal to or less than a certain number. As it is known, regarding biometric information, the same data cannot always be acquired stably. Thus, since individual data acquired from the same person is assumed to be similar to each other (data in which distance between individual elements is small can be acquired), application of the present invention to biometric authentication is particularly effective.

The above exemplary embodiment(s) may entirely or partially be described, but not limited to, as follows.

[Mode 1]

See the ciphertext matching system according to the above first aspect.

[Mode 2]

The ciphertext matching system according to mode 1;

wherein the data matching apparatus generates a plurality of challenges by using the ciphertext(s) of the registered data and the transmitted public key and transmits the generated challenges to the matching request apparatus; and wherein the matching request apparatus transmits a plurality of responses generated by using the transmitted challenges, the transmitted public key, and random numbers to the data matching apparatus.

[Mode 3]

The ciphertext matching system according to mode 2;

wherein the matching request apparatus transmits information for the data matching apparatus to generate the first-distance ciphertext by using first to third responses; and wherein the data matching apparatus transmits a set of hash values of values that can be taken by the first distance when the first distance is within a threshold range in which the registered data and the matching target data are allowable to be matched each other to the data matching apparatus by using a fourth response.

[Mode 4]

The ciphertext matching system according to mode 3; wherein the data matching apparatus transmits the first-distance-related ciphertext to the matching support apparatus as a first matching support request and transmits the fourth response to the matching support apparatus as a second matching support request.

[Mode 5]

The ciphertext matching system according to mode 4; wherein the matching support apparatus acquires the first distance kept secret by the random numbers by decrypting the ciphertext as the first matching support request by using the secret key, calculates a hash value of the acquired first distance, determines whether the calculated hash value of the first distance is included in the second matching support request, and transmits a result of the determination to the data matching apparatus.

[Mode 6]

The ciphertext matching system according to mode 5; wherein, based on the result of the determination, the data matching apparatus outputs a determination result of whether the registered data and the matching target data match each other.

[Mode 7]

The ciphertext matching system according to any one of modes 2 to 6; wherein one of the plurality of challenges generated by the data matching apparatus is masked by a first random number, another one of the challenges is masked by a second random number and a third random number, and a product of the first random number and the third random number matches the second random number.

[Mode 8]

The ciphertext matching system according to mode 7; wherein the matching request apparatus uses a fourth random number and a fifth random number when generating the plurality of responses; and wherein the data matching apparatus generates a ciphertext of a value obtained by adding the fifth random number to a product of a square of a Euclidean distance between the registered data and the matching target data and the fourth random number and the first random number.

[Mode 9]

The ciphertext matching system according to any one of modes 1 to 8; wherein the matching support apparatus uses elliptic Elgamal encryption as additive homomorphic encryption.

[Mode 10]

See the ciphertext matching method according to the above second aspect.

[Mode 11]

A program, causing a computer to perform processing for:

receiving a first-distance-related ciphertext in which a first distance between registered data and matching target data is kept secret by random numbers; and determining whether the first distance obtained by decrypting the first-distance-related ciphertext is included in a set of second distances in which the registered data and the matching target data are allowable to be matched each other.

This program can be recorded in a computer-readable storage medium. The storage medium may be a non-transient storage medium such as a semiconductor memory, a hard disk, a magnetic storage medium, or an optical storage medium. The present invention can be embodied as a computer program product.

[Mode 12]

A ciphertext matching system, including a registration target data generation apparatus, a storage apparatus, a matching request apparatus, a data matching apparatus, and a matching support apparatus;

wherein the registration target data generation apparatus includes:

a first template generation part that receives input data to be kept secret and a public key disseminated by the matching support apparatus and outputs encrypted data in which individual elements of the input data are kept secret by using the public key; and a second template generation part that receives the input data to be kept secret and the public key disseminated by the matching support apparatus and outputs encrypted data in which information about the input data is kept secret by using the public key;

wherein the storage apparatus includes;

an identifier generation part that adds a unique identifier to the encrypted data transmitted from the registration target data generation apparatus; and a template storage part that holds the set of the encrypted data and the identifier transmitted from the registration target data generation apparatus;

wherein the matching request apparatus includes;

a matching request part that receives matching target data and an identifier and generates a matching request;

first to fourth response generation parts that receive the matching target data, challenges transmitted from the data matching apparatus, and the public key disseminated by the matching support apparatus and generate responses;

wherein the data matching apparatus includes:

a target template reception part that receives the matching request from the matching request apparatus and a template corresponding to the identifier included in the matching request from the storage apparatus;

first to third challenge generation parts that receive the received template and the public key disseminated by the matching support apparatus and generate challenges; and first and second matching support request generation parts that receive responses from the matching request apparatus and generate matching support request data;

a determination part that receives a matching support result generated by the matching support apparatus in response to the matching support request data and generates a matching result; and wherein the matching support apparatus includes:

a key generation part that receives a security parameter, generates a public key and a secret key based on additive homomorphic encryption, disseminates the public key, and stores the secret key in a key storage part;

the key storage part that holds the secret key generated by the key generation part; and a matching support part that receives the matching support request data from the data matching apparatus and the secret key from the key storage part and generates a matching support result.

Modes 10 and 11 can be expanded in the same way as mode 1 is expanded to modes 2 to 9.

The disclosure of each of the above PTLs, etc. that have been referred to is incorporated herein by reference thereto. Variations and adjustments of the exemplary embodiment(s) and examples are possible within the scope of the overall disclosure (including the claims) of the present invention and based on the basic technical concept of the present invention. Various combinations and selections of various disclosed elements (including the elements in the claims, exemplary embodiment(s), examples, drawings, etc.) are possible within the scope of the entire disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

REFERENCE SIGNS LIST 10, 101 registration target data generation apparatus
11 first template generation part
12 second template generation part
20, 102 matching request apparatus
21 matching request part
22 first response generation part
23 second response generation part
24 third response generation part
25 fourth response generation part
30 storage apparatus
31 identifier generation part
32 template storage part
40, 103 data matching apparatus
41 target template reception part
42 first challenge generation part
43 second challenge generation part
44 third challenge generation part
45 first matching support request generation part
46 second matching support request generation part
47 determination part
50, 104 matching support apparatus
51 key generation part
52 key storage part
53 matching support part
111 CPU (Central Processing Unit)
112 memory
113 input-output interface
114 NIC (Network Interface Card)

The invention claimed is:

1. A ciphertext matching system, comprising:
a matching support apparatus comprising at least one processor configured to generate a public key and a secret key and transmits the public key to other apparatus;
a registration target data generation apparatus that comprises an input device for registered biometric data and generates a ciphertext(s) of the registered biometric data by using the public key;
a data matching apparatus comprising at least one processor configured to generate a plurality of challenges by using the ciphertext(s) of the registered biometrix data and the public key and transmits the generated challenges to the matching request apparatus;
a matching request apparatus comprising an input device for matching target biometric data and at least one processor configured to generate a plurality of responses generated by using the transmitted challenges, the public key, and random numbers and transmits the plurality of responses to the data matching apparatus for matching of the matching target biometric data against the registered biometric data;
wherein the data matching apparatus generates a first-distance-related ciphertext in which a first distance between the registered biometric data and the matching target biometric data is kept secret by random numbers and transmits the first-distance-related ciphertext to the matching support apparatus; and
wherein the matching support apparatus determines whether the first distance obtained by decrypting the first-distance-related ciphertext with the secret key is included in a set of second distances in which the registered biometric data and the matching target biometric data are allowable to be matched each other and transmits a result of the determination to the data matching apparatus.

2. The ciphertext matching system according to claim 1;
wherein the matching request apparatus transmits information for the data matching apparatus to generate the first-distance ciphertext by using first to third responses; and
wherein the data matching apparatus transmits a set of hash values of values that can be taken by the first distance when the first distance is within a threshold range in which the registered biometric data and the matching target biometric data are allowable to be matched each other to the data matching apparatus by using a fourth response.

3. The ciphertext matching system according to claim 2;
wherein the data matching apparatus transmits the first-distance-related ciphertext to the matching support apparatus as a first matching support request and transmits the fourth response to the matching support apparatus as a second matching support request.

4. The ciphertext matching system according to claim 3;
wherein the matching support apparatus acquires the first distance kept secret by the random numbers by decrypting the ciphertext as the first matching support request by using the secret key, calculates a hash value of the acquired first distance, determines whether the calculated hash value of the first distance is included in the second matching support request, and transmits a result of the determination to the data matching apparatus.

5. The ciphertext matching system according to claim 4;
wherein, based on the result of the determination, the data matching apparatus outputs a determination result of whether the registered biometric data and the matching target biometric data match each other.

6. The ciphertext matching system according to claim 1;
wherein one of the plurality of challenges generated by the data matching apparatus is masked by a first random number, another one of the challenges is masked by a second random number and a third random number, and a product of the first random number and the third random number matches the second random number.

7. The ciphertext matching system according to claim 6;
wherein the matching request apparatus uses a fourth random number and a fifth random number when generating the plurality of responses; and
wherein the data matching apparatus generates a ciphertext of a value obtained by adding the fifth random number to a product of a square of a Euclidean distance between the registered biometric data and the matching target biometric data and the fourth random number and the first random number.

8. The ciphertext matching system according to claim 1;
wherein the matching support apparatus uses elliptic Elgamal encryption as additive homomorphic encryption.

9. A ciphertext matching method, which is used in a ciphertext matching system including a registration target data generation apparatus that comprises an input device for registered biometric data, a matching request apparatus, a data matching apparatus, and a matching support apparatus, the ciphertext matching method comprising:

- causing the matching support apparatus to generate a public key and a secret key and transmits the public key to the registration target data generation apparatus, the data matching apparatus, and the matching request apparatus;
- causing the registration target data generation apparatus to generate a ciphertext(s) of registered biometric data by using the public key;
- causing the data matching apparatus to generate a plurality of challenges by using the ciphertext(s) of the registered biometric data and public key and transmit the generated challenges to the matching request apparatus;
- causing the matching request apparatus to generate a plurality of responses generated by using the transmitted challenges, the transmitted public key, and random numbers and transmit the plurality of responses to the data matching apparatus for matching of matching target data against the registered biometric data;
- causing the data matching apparatus to generate a first-distance-related ciphertext in which a first distance between the registered biometric data and the matching target biometric data is kept secret by random numbers, for matching the matching target data against the registered data; and
- causing the matching support apparatus to determine whether the first distance obtained by decrypting the first-distance-related ciphertext with the secret key is included in a set of second distances in which the registered biometric data and the matching target biometric data are allowable to be matched each other and transmit a result of the determination to the data matching apparatus.

10. The ciphertext matching method according to claim 9;
wherein the matching request apparatus transmits information for the data matching apparatus to generate the first-distance ciphertext by using first to third responses; and
wherein the data matching apparatus transmits a set of hash values of values that can be taken by the first distance when the first distance is within a threshold range in which the registered biometric data and the matching target biometric data are allowable to be matched each other to the data matching apparatus by using a fourth response.

11. The ciphertext matching method according to claim 10;
wherein the data matching apparatus transmits the first-distance-related ciphertext to the matching support apparatus as a first matching support request and transmits the fourth response to the matching support apparatus as a second matching support request.

12. The ciphertext matching method according to claim 11;
wherein the matching support apparatus acquires the first distance kept secret by the random numbers by decrypting the ciphertext as the first matching support request by using the secret key, calculates a hash value of the acquired first distance, determines whether the calculated hash value of the first distance is included in the second matching support request, and transmits a result of the determination to the data matching apparatus.

13. The ciphertext matching method according to claim 12;
wherein, based on the result of the determination, the data matching apparatus outputs a determination result of whether the registered biometric data and the matching target biometric data match each other.

14. The ciphertext matching method according to claim 9;
wherein one of the plurality of challenges generated by the data matching apparatus is masked by a first random number, another one of the challenges is masked by a second random number and a third random number, and a product of the first random number and the third random number matches the second random number.

15. The ciphertext matching method according to claim 14;
wherein the matching request apparatus uses a fourth random number and a fifth random number when generating the plurality of responses; and
wherein the data matching apparatus generates a ciphertext of a value obtained by adding the fifth random number to a product of a square of a Euclidean distance between the registered biometric data and the matching target biometric data and the fourth random number and the first random number.

16. The ciphertext matching method according to claim 9;
wherein the matching support apparatus uses elliptic Elgamal encryption as additive homomorphic encryption.

17. A non-transitory computer readable medium storing a program causing a computer to perform processing for:
- receiving a first-distance-related ciphertext in which a first distance between registered biometric data and matching target biometric data is kept secret by random numbers;
- determining whether the first distance obtained by decrypting the first-distance-related ciphertext is included in a set of second distances in which the registered biometric data and the matching target biometric data are allowable to be matched each other;
- generating a public key and a secret key; and
- transmitting the public key to a registration target data generation apparatus, a data matching apparatus, and a matching request apparatus.

18. The non-transitory computer readable medium according to claim 17;
- acquiring the first distance kept secret by the random numbers by decrypting the first-distance-related ciphertext by using the secret key;
- calculating a hash value of the acquired first distance; and
- determining whether the calculated hash value of the first distance is included in a set of hash values that can be taken when the first distance is within a threshold range in which the registered biometric data and the matching target biometric data are allowable to be matched each other.

* * * * *